(12) United States Patent
Davis et al.

(10) Patent No.: US 9,863,332 B2
(45) Date of Patent: Jan. 9, 2018

(54) SYSTEM AND METHOD FOR DETERMINING AN OIL CONTAMINATION LEVEL OF AN ENGINE BASED ON A SWITCHING PERIOD OF A VALVE LIFT ACTUATOR TO IMPROVE ENGINE STARTUPS

(71) Applicant: GM Global Technology Operations LLC, Detroit, MI (US)

(72) Inventors: Jason T. Davis, Williamston, MI (US); Melvin R. Terechenok, Jr., Canton, MI (US); Scott McLane, Farmington Hills, MI (US); Sanjeev M. Naik, Troy, MI (US); Kurt Alfred Wellenkotter, Beverly Hills, MI (US); Douglas R. Verner, Sterling Heights, MI (US); Joseph J. Moon, Beverly Hills, MI (US); Kevin Andrew Gady, Saline, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 162 days.

(21) Appl. No.: 14/709,921

(22) Filed: May 12, 2015

(65) Prior Publication Data
US 2016/0333803 A1     Nov. 17, 2016

(51) Int. Cl.
*F02D 13/08*     (2006.01)
*F02D 13/02*     (2006.01)
(Continued)

(52) U.S. Cl.
CPC .......... *F02D 13/08* (2013.01); *F01L 13/0036* (2013.01); *F02D 13/0207* (2013.01); *F02D 41/042* (2013.01); *F02D 41/221* (2013.01); *F01L 2001/0473* (2013.01); *F01L 2013/0052* (2013.01); *F01L 2013/101* (2013.01); *F01L 2800/03* (2013.01); *F02D 2041/2055* (2013.01);
(Continued)

(58) Field of Classification Search
CPC .. F02D 13/0203; F02D 13/0207; F02D 13/08; F02D 2041/2055; F02D 2041/227; F02D 41/042; F02D 41/221; F01L 13/0036; F01L 2001/0473; F01L 2013/0052; F01L 2013/101; F01L 2800/03; Y02T 10/18
USPC .................. 123/90.15, 90.1, 90.11; 701/102
See application file for complete search history.

(56) References Cited

U.S. PATENT DOCUMENTS

| | | | |
|---|---|---|---|
| 9,403,427 B2* | 8/2016 | Haladyna ................. | B60K 6/48 |
| 2011/0035132 A1* | 2/2011 | Hehle ....................... | F01L 1/32 |
| | | | 701/102 |
| 2014/0251242 A1* | 9/2014 | Verner ..................... | F01L 1/34 |
| | | | 123/90.11 |

* cited by examiner

*Primary Examiner* — Mark Laurenzi
*Assistant Examiner* — Paul Thiede (57) ABSTRACT

A system according to the principles of the present disclosure includes a switching period module and at least one of a valve lift control module and a start-stop control module. The switching period module determines a switching period that elapses as a valve lift actuator of an engine switches between a first valve lift position and a second valve lift position that is different than the first lift position. The switching period begins when a measured position of the valve lift actuator corresponds to the first lift position and the switching period ends when the measured position of the valve lift actuator corresponds to the second lift position. The valve lift control module controls the valve lift actuator based on the switching period. The start-stop control module determines whether to automatically stop the engine based on the switching period.

24 Claims, 4 Drawing Sheets

(51) Int. Cl.
*F02D 41/04* (2006.01)
*F02D 41/20* (2006.01)
*F02D 41/22* (2006.01)
*F01L 13/00* (2006.01)
*F01L 1/047* (2006.01)

(52) U.S. Cl.
CPC ......... *F02D 2041/227* (2013.01); *Y02T 10/18* (2013.01)

# SYSTEM AND METHOD FOR DETERMINING AN OIL CONTAMINATION LEVEL OF AN ENGINE BASED ON A SWITCHING PERIOD OF A VALVE LIFT ACTUATOR TO IMPROVE ENGINE STARTUPS

FIELD

The present disclosure relates to internal combustion engines, and more specifically, to systems and methods for determining an oil contamination level of an engine based on a switching period of a valve lift actuator to improve engine startups.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

An intake valve regulates air flow into each of the cylinders, and an exhaust valve regulates the flow of exhaust gas exiting each of the cylinders. In a cam-driven valvetrain, the intake and exhaust valves open when cam followers coupled to the valves engage lobes on a camshaft of the engine as the camshaft rotates. In some cam-driven valvetrains, a valve lift actuator adjusts which ones of the lobes the cam followers engage to adjust the amount by which the intake and exhaust valves lift from their respective valve seats when they open, which is referred to as valve lift.

SUMMARY

A system according to the principles of the present disclosure includes a switching period module and at least one of a valve lift control module and a start-stop control module. The switching period module determines a switching period that elapses as a valve lift actuator of an engine switches between a first valve lift position and a second valve lift position that is different than the first lift position. The switching period begins when a measured position of the valve lift actuator corresponds to the first lift position and the switching period ends when the measured position of the valve lift actuator corresponds to the second lift position. The valve lift control module controls the valve lift actuator based on the switching period. The start-stop control module determines whether to automatically stop the engine based on the switching period.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Some cam-driven valvetrains include cam lobes that are rotatably coupled to a camshaft, and a valve lift actuator that translates the cam lobes along a longitudinal axis of the camshaft to adjust which ones of the cam lobes are engaged by a cam follower. In valvetrains such as these, the valve lift actuator and/or the translatable cam lobes may be referred to as a sliding cam actuator. In one example of a sliding cam actuator, the cam lobes include a low lift lobe and a high lift lobe, and the valve lift actuator switches between a low lift position and a high lift position. In the low lift position, the cam follower engages the low lift lobe as the camshaft rotates. In the high lift position, the cam follower engages the high lift lobe as the camshaft rotates.

When an engine is shutdown normally (i.e., based on an ignition system), some engine control systems adjust the sliding cam actuator to the low lift position to achieve a desired air/fuel ratio for restarting the engine during engine cranking. However, starting the engine with the sliding cam actuator in the low lift position yields higher levels of engine vibration relative to starting the engine with the sliding cam actuator in the high lift position. While higher vibration levels may be acceptable to a driver during normal engine startups, higher vibration levels are likely to dissatisfy the driver when the engine is started automatically (i.e., independent of an ignition system). Thus, during an automatic engine shutdown, some engine controls systems adjust the sliding cam actuator to the high lift position before the engine stops, and then switch the sliding cam actuator to the low lift position when the engine is automatically restarted.

Cam-driven valvetrains are typically submersed in engine oil to lubricate the moving parts of the valvetrains. Over time, the contamination level of the engine oil increases. As the contamination level of the engine oil increases, the amount of time required for a sliding cam actuator to switch between valve lift positions increases. Eventually, during automatic engine startups, the sliding cam actuator may not be capable of switching from the high lift position to the low lift position quick enough to ensure that a desired air/fuel ratio is achieved. Thus, increased oil contamination levels may prevent the engine from restarting after the engine is automatically shutdown.

The startability issues discussed above may be overcome by upgrading the engine control system and the sliding cam actuator. The engine control system may be upgraded by adding high power drivers, analog multiplexers, and the associated circuitry. The sliding cam actuator may be upgraded by replacing a cam actuator having a typical resistance (e.g., 3 ohms) with a cam actuator having a very low resistance (e.g., 1 ohm). However, upgrading the engine control system and the sliding cam actuator as described above increases the cost of the engine system.

A system and method according to the present disclosure determines the period that elapses as the sliding cam actuator switches between two lift positions and controls an engine based on the switching period to ensure that the engine may be restarted. The switching period may be determined based on a measured position of the valve lift actuator. In one example, the system and method prevents automatic engine stops when the switching period is greater than a threshold, indicating a high oil contamination level. Thus, the system and method only allows an automatic engine stop when the engine can be automatically restarted with the sliding cam actuator in the low lift position. This avoids automatically restarting the engine when the sliding cam actuator is in the low lift position, which may yield high levels of engine vibration that dissatisfy the driver.

In another example, when the switching period is greater than the threshold, the system and method switches the sliding cam actuator to the low lift position during an automatic engine stop. In this way, the system and method ensures that the engine can be restarted after the engine is automatically stopped. However, as noted above, starting the engine with the sliding cam actuator in the low lift position may yield high levels of engine vibration that dissatisfy the driver. Thus, the system and method may also activate a service indicator to notify the driver that an oil change is required.

The system and method determines the switching period based on feedback from an actuator position sensor that measures the position of the sliding cam actuator. The cost of the actuator position sensor is less than the cost of upgrading the engine control system and the sliding cam actuator to overcome startability issues. In addition, some engine systems may already include the actuator position sensor for use in, for example, controlling the sliding cam actuator using a closed-loop control technique. In these engine systems, the system and method according to the present disclosure may be used to address startability issues without adding any cost to the engine system.

Figure 1:
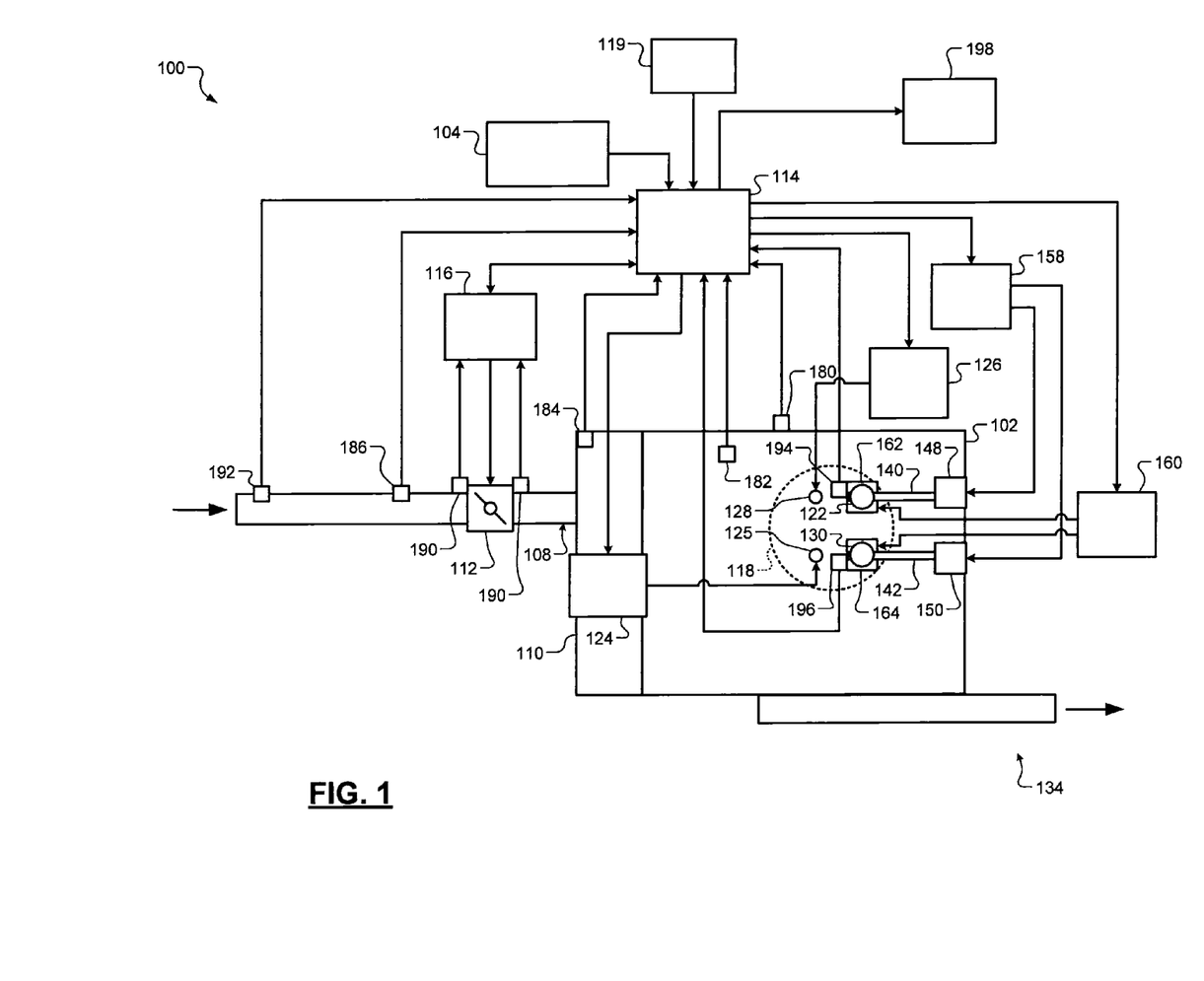
FIG. 1 is a functional block diagram of an example engine system according to the principles of the present disclosure.

Referring now to FIG. 1, an engine system 100 includes an engine 102 that combusts an air/fuel mixture to produce drive torque for a vehicle. The amount of drive torque produced by the engine 102 is based on driver input from a driver input module 104. Air is drawn into the engine 102 through an intake system 108. The intake system 108 includes an intake manifold 110 and a throttle valve 112. The throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. For illustration purposes, a single representative cylinder 118 is shown. However, the engine 102 may include multiple cylinders. For example, the engine 102 may include 2, 3, 4, 5, 6, 8, 10, and/or 12 cylinders. The ECM 114 may deactivate one or more of the cylinders, which may improve fuel economy under certain engine operating conditions.

The ECM 114 may start and stop the engine 102 based on an input received from an ignition system 119. The ignition system 119 may include a key or a button. The ECM 114 may start the engine 102 when a driver turns the key from an off position to an on (or run) position or when the driver presses the button. The ECM 114 may stop the engine 102 when the driver turns the key from the on position to the off position or when the driver presses the button while the engine 102 is running.

The engine 102 may operate using a four-stroke cycle. The four strokes include an intake stroke, a compression stroke, a combustion stroke, and an exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates a fuel injector 125 to control the amount of fuel provided to the cylinder to achieve a desired air/fuel ratio. The fuel injector 125 may inject fuel directly into the cylinder 118 or into a mixing chamber associated with the cylinder 118. The fuel actuator module 124 may halt fuel injection into cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 in the cylinder 118 based on a signal from the ECM 114. The spark ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. A firing event causes combustion in a cylinder when an air/fuel mixture is provided to the cylinder (e.g., when the cylinder is active). The spark actuator module 126 may have the ability to vary the timing of the spark for each firing event. The spark actuator module 126 may even be capable of varying the spark timing for a next firing event when the spark timing signal is changed between a last firing event and the next firing event. In various implementations, the engine 102 may include multiple cylinders and the spark actuator module 126 may vary the spark timing relative to TDC by the same amount for all cylinders in the engine 102.

During the combustion stroke, the combustion of the air/fuel mixture drives the piston down, thereby driving the crankshaft. As the combustion of the air/fuel mixture drives the piston down, the piston moves from TDC to its bottommost position, referred to as bottom dead center (BDC). During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The time at which the intake valve 122 is opened may be varied with respect to piston TDC by an intake cam phaser 148. The time at which the exhaust valve 130 is opened may be varied with respect to piston TDC by an exhaust cam phaser 150. The ECM 114 may disable opening of the intake and exhaust valves 122, 130 of cylinders that are deactivated. A phaser actuator module 158 may control the intake cam phaser 148 and the exhaust cam phaser 150 based on signals from the ECM 114.

The ECM 114 may adjust the lift of the intake and exhaust valves 122, 130 by instructing a valve lift actuator module 160 to achieve a desired intake valve lift and a desired exhaust valve lift, respectively. In turn, the valve lift actuator module 160 controls an intake valve lift actuator 162 and an exhaust valve lift actuator 164 to achieve the desired intake valve lift and the desired exhaust valve lift, respectively. The valve lift actuator module 160 may switch the intake and exhaust valve lift actuators 162, 164 between a zero lift position, a low lift position, and a high lift position.

When the intake and exhaust valve lift actuators 162, 164 are in the zero lift position, the intake and exhaust valves 122, 130 do not lift from their respective valve seats. The ECM 114 may adjust the intake and exhaust valve lift actuators 162, 164 to the zero lift position to disable opening of the intake and exhaust valves 122, 130 and thereby deactivate the cylinder 118. When the intake and exhaust valve lift actuators 162, 164 are in the high lift position, the intake and exhaust valves 122, 130 lift from their respective valve seats by a greater amount relative to when the intake and exhaust valve lift actuators 162, 164 are in the low lift position.

In one example, the intake and exhaust valves 122, 130 lift from their respective valve seats due to contact between cam followers coupled to the intake and exhaust valves 122, 130 and lobes on the intake and exhaust camshafts 140, 142. The lobes may be coupled to the intake and exhaust camshafts 140, 142 for rotation therewith and translatable along the longitudinal axes of the intake and exhaust camshafts 140, 142. The intake and exhaust valve lift actuators 162, 164 may include solenoids that adjust the lift of the intake and exhaust valves 122, 130 by translating the lobes along the longitudinal axes of the intake and exhaust camshafts 140, 142. Translating the lobes along the longitudinal axes of the intake and exhaust camshafts 140, 142 switches the lobes with which the cam followers are in contact. This example is described further below with reference to FIG. 2.

In another example, the intake and exhaust valve lift actuators 162, 164 are electromagnetic or electrohydraulic actuators that control the lift, timing, and duration of the intake and exhaust valves 122, 130 independent from the intake and exhaust camshafts 140, 142. In this example, the intake and exhaust camshafts 140, 142, the intake and exhaust cam phasers 148, 150, and the phaser actuator module 158 may be omitted. In addition, the intake and exhaust valve lift actuators 162, 164 may be referred to as camless valve actuators.

The position of the crankshaft may be measured using a crankshaft position (CKP) sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The position of the intake valve lift actuator 162 may be measured using an intake valve lift (IVL) sensor 194. The position of the exhaust valve lift actuator 164 may be measured using an exhaust valve lift (EVL) sensor 196. The positions of the intake and exhaust valve lift actuators 162, 164 indicate the amounts by which the intake and exhaust valves 122, 130 are lifted from their respective valve seats.

The ECM 114 uses signals from the sensors to make control decisions for the engine system 100. For example, the ECM 114 uses the positions of the intake and exhaust valve lift actuators 162, 164 to determine a switching period that elapses as the intake and exhaust valve lift actuators 162, 164 switch between lift positions. The ECM 114 may then adjust the positions of the intake and exhaust valve lift actuators 162, 164 before the engine 102 is stopped based on the switching period. In addition, the ECM 114 may determine whether to automatically stop the engine 102 (i.e., stop the engine 102 independent of the ignition system 119) based on the switching period.

In one example, before the engine 102 is stopped, the ECM 114 may predict whether the intake and exhaust valve lift actuators 162, 164 are capable of switching from the high or zero lift position to the low lift position when the engine 102 is restarted. If the intake and exhaust valve lift actuators 162, 164 are not capable of switching to the low lift position at the next engine startup, the ECM 114 may not automatically stop the engine 102 to avoid vibrations caused by starting the engine 102 in the low lift position. Alternatively, the ECM 114 may adjust the intake and exhaust valve lift actuators 162, 164 to the low lift position before the engine 102 is stopped, and the ECM 114 may activate a service indicator 198. When activated, the service indicator 198 indicates that service is required using a visual message (e.g., text, a light, and/or a symbol), an audible message (e.g., a chime), and/or a tactile message (e.g., vibration).

Figure 2:
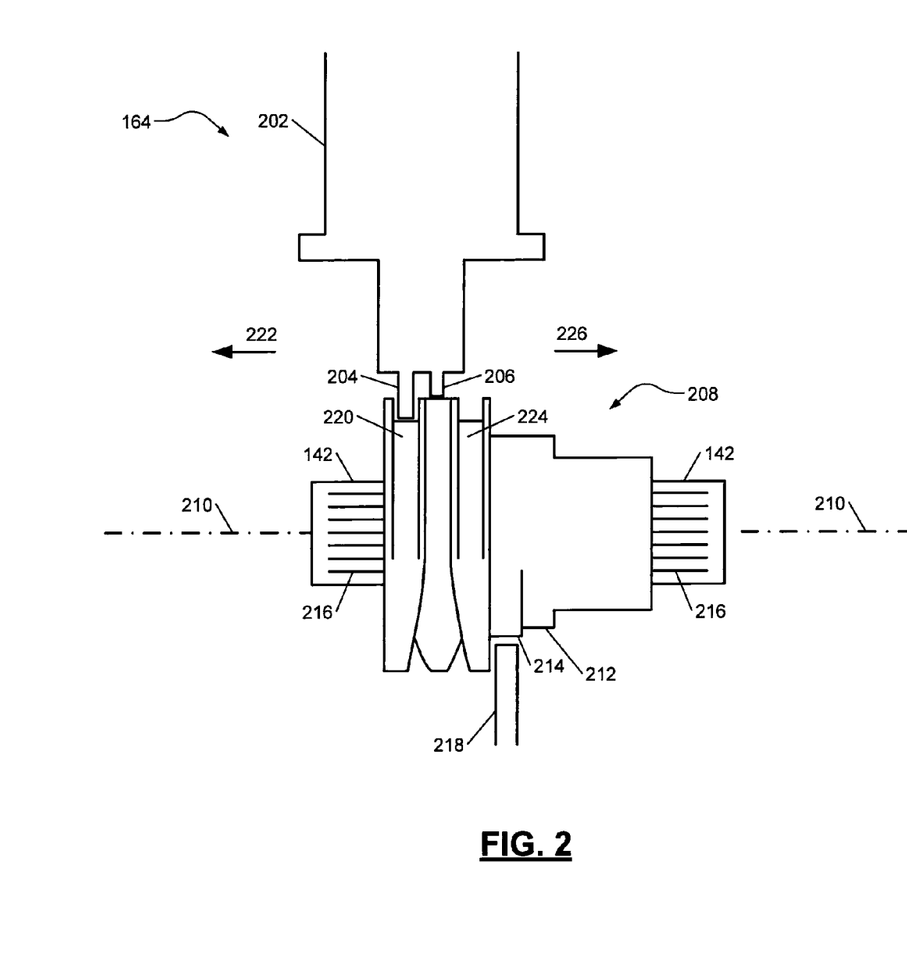
FIG. 2 is a planar view of an example valve lift actuator and camshaft assembly according to the principles of the present disclosure.

Referring now to FIG. 2, an example implementation of the exhaust valve lift actuator 164 includes a solenoid 202, a first pin 204, and a second pin 206. The exhaust valve lift actuator 164 switches between the low and high lift positions by translating a camshaft segment 208 along a longitudinal axis 210 of the exhaust camshaft 142. The camshaft segment 208 includes a low lift lobe 212, a high lift lobe 214, and internal splines (not shown). The internal splines engage external splines 216 on the camshaft 142 to rotatably couple the camshaft segment 208 to the camshaft 142 while allowing the camshaft segment 208 to translate along the longitudinal axis 210 with respect to the camshaft 142. In the low lift position, a cam follower 218 coupled to the exhaust valve 130 engages the low lift lobe 212 as the camshaft 142 rotates. In the high lift position, shown in FIG. 2, the cam follower 218 engages the high lift lobe 214 as the exhaust camshaft 142 rotates.

To switch the exhaust valve lift actuator 164 from the low lift position to the high lift position, the solenoid 202 extends the first pin 204 into a first groove 220 in the camshaft segment 208 so that the first pin 204 engages the first groove 220. The first groove 220 has a spiral shape so that, as the camshaft 142 rotates, the engagement between the first pin 204 and the first groove 220 causes the camshaft segment 208 to translate in a direction 222 along the longitudinal axis 210. In turn, the cam follower 218 stops engaging the low lift lobe 212 as the camshaft 142 rotates and starts engaging the high lift lobe 214 as the camshaft 142 rotates.

To switch the exhaust valve lift actuator 164 from the high lift position to the low lift position, the solenoid 202 extends the second pin 206 into a second groove 224 in the camshaft segment 208 so that the second pin 206 engages the first groove 220. The second groove 224 has a spiral shape so that, as the camshaft 142 rotates, the engagement between the second pin 206 and the second groove 224 causes the camshaft segment 208 to translate in a direction 226 along the longitudinal axis 210. In turn, the cam follower 218 stops engaging the high lift lobe 214 as the camshaft 142 rotates and starts engaging the low lift lobe 212 as the camshaft 142 rotates.

Although the discussion above focuses on the exhaust valve lift actuator 164 and the exhaust camshaft 142, the intake valve lift actuator 162 and the intake camshaft 140 may be similarly configured. Also, the IVL and EVL sensors 194 and 196 may measure the positions of the intake and exhaust valve lift actuators 162 and 164 by measuring the positions of the first and second pins 204 and 206. In addition, although the camshaft segment 208 is shown with only two lift lobes (i.e., the low and high lift lobes 212, 214), the camshaft segment 208 may include additional lift lobe (s), including a zero lift lobe. Further, the camshaft segment 208 may define additional groove(s) to facilitate engaging the cam follower 218 with the additional lift lobe(s).

Figure 3:
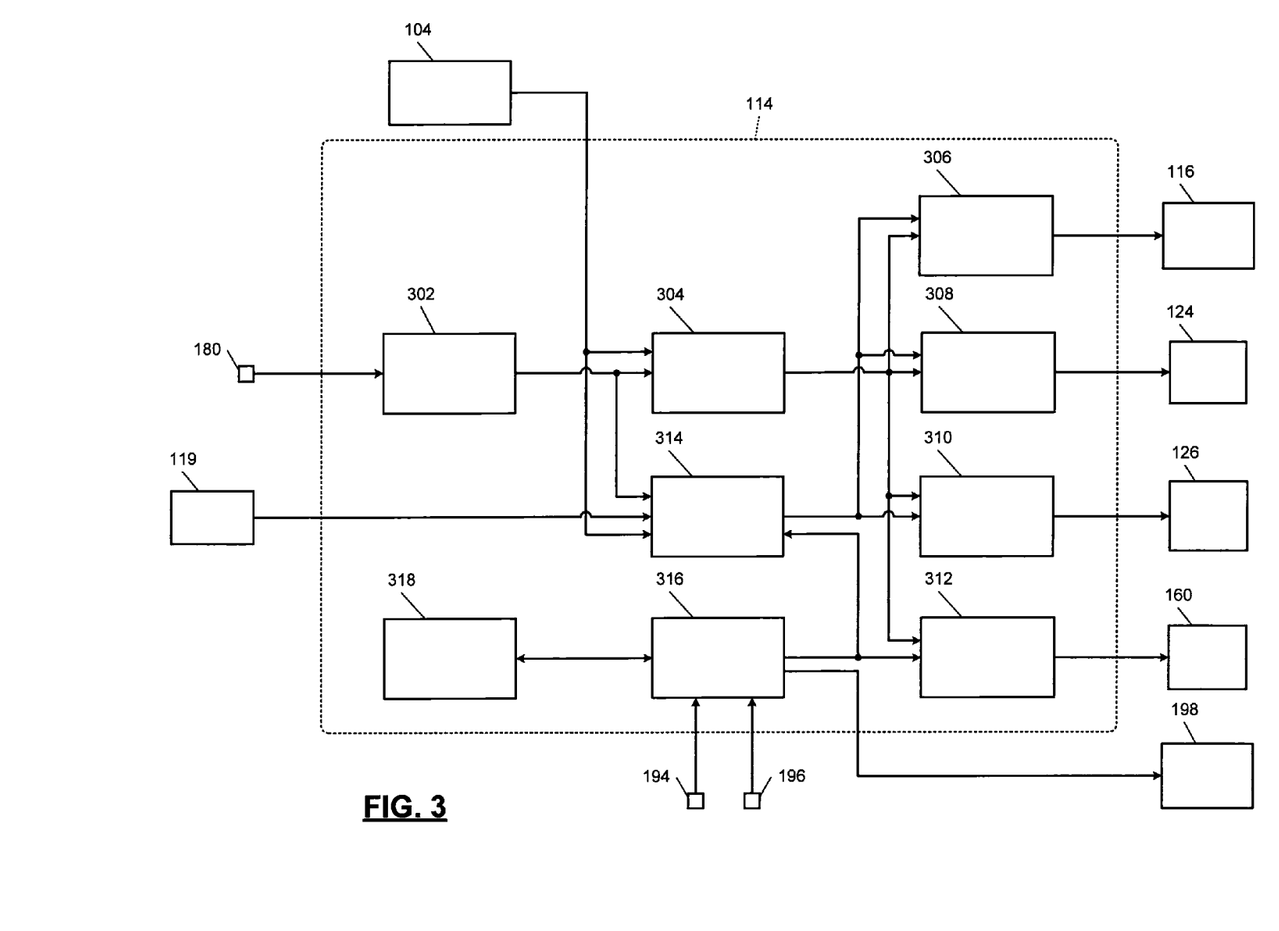
FIG. 3 is a functional block diagram of an example control system according to the principles of the present disclosure.

Referring now to FIG. 3, an example implementation of the ECM 114 includes an engine speed module 302, a torque request module 304, a throttle control module 306, a fuel control module 308, a spark control module 310, and a valve lift control module 312. The engine speed module 302 determines the speed of the engine 102 based on the crankshaft position from the CKP sensor 180. For example, the engine speed module 302 may calculate the engine speed based on a period that elapses as the crankshaft completes one or more revolutions. The engine speed module 302 outputs the actual engine speed.

The torque request module 304 determines a torque request based on the driver input from the driver input module 104. For example, the torque request module 304 may store one or more mappings of accelerator pedal position to desired torque and determine the torque request based on a selected one of the mappings. The torque request module 304 may select one of the mappings based on the engine speed and/or vehicle speed. The torque request module 304 outputs the torque request.

The throttle control module 306 controls the throttle valve 112 by instructing the throttle actuator module 116 to achieve a desired throttle area. The fuel control module 308 controls the fuel injector 125 by instructing the fuel actuator module 124 to achieve a desired injection amount and/or timing. The spark control module 310 controls the spark plug 128 by instructing the spark actuator module 126 to achieve desired spark timing. The valve lift control module 312 controls the intake and exhaust valve lift actuators 162, 164 by instructing the valve lift actuator module 160 to achieve the desired intake valve lift and the desired exhaust valve lift. The desired intake valve lift and the desired exhaust valve lift may be collectively referred to as a desired valve lift.

The throttle control module 306, the spark control module 310, and the valve lift control module 312 may adjust the desired throttle area, the desired spark timing, and the desired valve lift, respectively, based on the torque request. The throttle control module 306 may increase or decrease the desired throttle area when the torque request increases or decreases, respectively. The spark control module 310 may advance or retard the spark timing when the torque request increases or decreases, respectively. The valve lift control module 312 may increase or decrease the desired valve lift when the torque request increases or decreases, respectively.

The fuel control module 308 may adjust the desired injection amount and/or the desired injection timing to achieve a desired air/fuel ratio such as a stoichiometric air/fuel ratio. For example, the fuel control module 308 may adjust the desired injection amount and/or the desired injection timing to minimize a difference between an actual air/fuel ratio and the desired air/fuel ratio. Controlling the air/fuel ratio in this way may be referred to as closed-loop control of the air/fuel ratio.

The example implementation of the ECM 114 shown in FIG. 3 also includes a start-stop module 314, a switching period module 316, and an oil contamination level module 318. The start-stop module 314 starts and stops the engine 102 based on the input from the ignition system 119. As discussed above, the ignition system 119 may include a key or a button. The start-stop module 314 may start the engine 102 when the driver turns the key from an off position to an on (or run) position or when the driver presses the button. The start-stop module 314 may stop the engine 102 when the driver turns the key from the on position to the off position or when the driver presses the button while the engine 102 is running.

The start-stop module 314 may start and stop the engine 102 by sending instructions to the throttle control module 306, the fuel control module 308, the spark control module 310, and/or a starter control module (not shown). The starter control module may start the engine 102 by activating a starter (not shown). In turn, the starter may engage a flywheel (not shown) of the engine and rotate the flywheel to increase the engine speed to an idle speed.

The throttle control module 306 may start the engine 102 by instructing the throttle actuator module 116 to open the throttle valve 112. The throttle control module 306 may stop the engine 102 by instructing the throttle actuator module 116 to fully close the throttle valve 112. The fuel control module 308 may start the engine 102 by instructing the fuel actuator module 124 to start delivering fuel to the cylinders of the engine 102. The fuel control module 308 may stop the engine 102 by instructing the fuel actuator module 124 to stop delivering fuel to the cylinders of the engine 102.

The spark control module 310 may start the engine 102 by instructing the spark actuator module 126 to start generating spark in the cylinders. The spark control module 310 may stop the engine 102 by instructing the spark actuator module 126 to stop generating spark in the cylinders. The spark control module 310 may instruct the spark actuator module 126 to stop generating spark in the cylinders when the engine speed is less than a predetermined speed (e.g., 600 revolutions per minute (RPM)).

The start-stop module 314 automatically stops the engine 102 (i.e., stops the engine 102 independent of the ignition system 119) when the vehicle is stopped and the engine 102 is idling. For example, the start-stop module 314 may automatically stop the engine 102 when the vehicle speed is less than or equal to a predetermined speed (e.g., zero) and the driver depresses a brake pedal (not shown). The start-stop module 314 may determine whether the brake pedal is depressed or released based on the driver input from the driver input module 104.

The start-stop module 314 may automatically restart the engine 102 when the driver depresses an accelerator pedal (not shown). The start-stop module 314 may determine whether the accelerator pedal is depressed or released based on the driver input from the driver input module 104. In addition, the start-stop module 314 may automatically restart the engine 102 when the driver releases the brake pedal and/or when the vehicle speed is greater than zero.

As the engine speed decreases during an engine stop, the valve lift control module 312 may adjust the intake and exhaust valve lift actuators 162, 164 to desired lift positions for starting the engine 102. For example, the valve lift control module 312 may adjust the intake and exhaust valve lift actuators 162, 164 to the desired lift positions when the engine speed is less than a predetermined speed (e.g., 800 RPM). When the start-stop module 314 stops the engine 102 normally (i.e., based on the input from the ignition system 119), the valve lift control module 312 may adjust the intake and exhaust valve lift actuators 162, 164 to the low lift position before the engine 102 is stopped. This ensures that a desired air/fuel ratio for starting the engine 102 may be achieved during engine cranking when start-stop module 314 attempts to restart the engine 102, and thereby ensures that the engine 102 may be restarted.

When the start-stop module 314 automatically stops the engine 102, the valve lift control module 312 may adjust the intake and exhaust valve lift actuators 162, 164 to the high lift position before the engine 102 is stopped. This avoids high levels of engine vibration resulting from starting the engine 102 with the intake and exhaust valve lift actuators 162, 164 in the low lift position. However, to ensure that the engine 102 restarts, the valve lift control module 312 may switch the intake and exhaust valve lift actuators 162, 164 from the high lift position to the low lift position when the start-stop module 314 begins to restart the engine 102.

The switching period module 316 determines periods that elapse as the intake and exhaust valve lift actuators 162, 164 switch between two lift positions. The two lift positions may include any two of the zero, low, and high lift positions. The periods that elapse as the intake and exhaust valve lift actuators 162, 164 switch between two lift positions may be referred to as the switching periods of the intake and exhaust valve lift actuators 162, 164. The switching period module 316 determines the switching periods of the intake and exhaust valve lift actuators 162, 164 based on their respective positions. The switching period module 316 receives the positions of the intake and exhaust valve lift actuators 162, 164 from the IVL sensor 194 and the EVL sensor 196, respectively. The switching period module 316 outputs the switching periods of the intake and exhaust valve lift actuators 162, 164.

The oil contamination level module 318 determines a contamination level of oil that is circulated through the engine 102. The oil contamination level module 318 may use the switching periods of the intake and exhaust valve lift actuators 162, 164 as a qualitative measure of the oil contamination level. For example, the oil contamination level module 318 may determine that the oil contamination level is normal when the switching periods are less than or equal to a first period. Conversely, the oil contamination level module 318 may determine that the oil contamination level is high when one or both of the switching periods are greater than the first period. The oil contamination level module 318 outputs the oil contamination level. The oil contamination level module 318 may also output a signal indicating whether the switching periods are greater than the first period. Alternatively, the switching period module 316 may determine whether the switching periods are greater than the first period and output a signal indicating the determination.

The oil contamination level module 318 may determine the oil contamination level based on multiple values of each of the switching periods of the intake and exhaust valve lift actuators 162, 164. For example, the oil contamination level module 318 may apply a first order lag filter to each of the switching periods, and determine the oil contamination level based on the filtered switching periods. The first order lag filtered may be embodied in a relationship such as $$(T_{sw})_f = k*(T_{sw})_i + (1-k)*(T_{sw})_{i-1}$$

where torque $(T_{sw})_f$ is a filtered switching period, k is a constant, $(T_{sw})_i$ is the current value of a switching period, and $(T_{sw})_i$ is a previous value of the switching period.

In another example, the oil contamination level module 318 may determining a running average of each of the switching periods of the intake and exhaust valve lift actuators 162, 164, and determine the oil contamination level based on the running averages. The running averages may be average values of multiple values of each of the switching periods determined over a predetermined period of hours, days, weeks, or months. When the sample size of the switching periods corresponds to the predetermined period, the oil contamination level module 318 may discard the oldest value of each switching period before determining the average value of the multiple values of each switching period.

The first period may be determined by the oil contamination level module 318 or the switching period module 316. In one example, the switching period module 316 determines the first period based on the oil contamination level, an engine oil temperature, and/or a vehicle altitude. The engine oil temperature may be measured or estimated based on, for example, the engine coolant temperature from the ECT sensor 182. The vehicle altitude may be measured or estimated based on, for example, the manifold pressure from the MAP sensor 184.

Before the engine 102 is stopped, the switching period module 316 may predict whether the valve lift actuators 162, 164 are capable of switching from the zero or high lift positions to the low lift position within a second period when the engine 102 is restarted. The switching period module 316 may make this prediction based on the oil contamination level, the engine oil temperature, and the vehicle altitude. The second period may be predetermined, and the engine 102 may not restart when one or both of the intake and exhaust valve lift actuators 162, 164 are not capable of switching from the zero or high lift positions to the low lift position within the second period.

The switching period module 316 may determine the first period based on the above prediction. For example, the first period may be adjusted so that the switching periods are less than or equal to the first period when the prediction indicates that the intake and exhaust valve lift actuators 162, 164 are capable of switching to the low lift position within the second period. Conversely, the first period may be adjusted so that at least one of the switching periods is greater than the first period when the prediction indicates that at least one of the valve lift actuators 162, 164 is not capable of switching to the low lift position within the second period.

The start-stop module 314 may adjust automatic start-stop operation of the engine 102 based on the switching periods of the intake and exhaust valve lift actuators 162, 164. For example, the start-stop module 314 may prevent automatic engine stops when the switching period(s) of one or both of the intake and exhaust valve lift actuators 162, 164 is greater than the first period, indicating that the oil contamination level is high. Thus, the start-stop module 314 may only allow automatic engine stops when the intake and exhaust valve lift actuators 162, 164 are capable of switching to the low lift position quick enough to start the engine 102.

Additionally or alternatively, the valve lift control module 312 may adjust the position of the intake and exhaust valve lift actuators 162, 164 during an automatic engine stop based on the switching periods of the intake and exhaust valve lift actuators 162, 164. For example, during an automatic engine stop, the valve lift control module 312 may switch the intake and exhaust valve lift actuators 162, 164 from the zero or high lift position to the low lift position before the engine 102 stops. In this way, the valve lift control module 312 ensures that the engine 102 may be restarted after the engine 102 is automatically stopped.

Preventing automatic engine stops and/or high levels of engine vibration resulting from starting the engine 102 with the intake and exhaust valve lift actuators 162, 164 in the low lift positon may dissatisfy the driver. Thus, the valve lift control module 312, the switching period module 316, or the oil contamination level module 318 may activate the service indicator 198 when the switching period of the intake or exhaust valve lift actuators 162 or 164 is greater than the first period. In the example implementation of the ECM 114 shown in FIG. 3, the switching period module 316 activates the service indicator 198 when the switching period of the intake or exhaust valve lift 162, 164 is greater than the first period. When activated for this reason, the service indicator 198 may notify the driver that an oil change is required.

Figure 4:
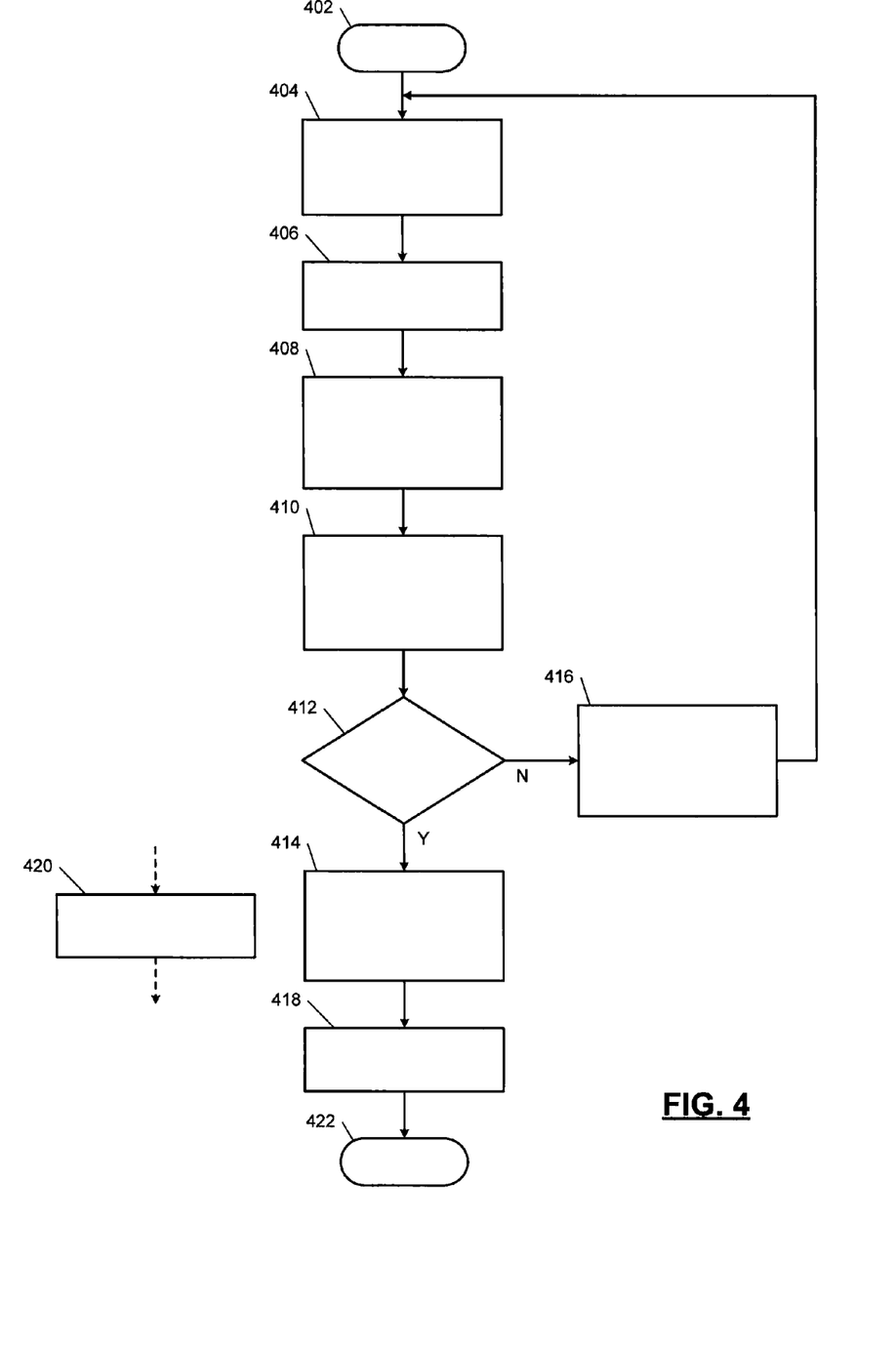
FIG. 4 is a flowchart illustrating an example control method according to the principles of the present disclosure.

Referring now to FIG. 4, an example method for determining the oil contamination level of the engine 102 based on the switching periods of the intake valve lift actuator 162 to improve the startability of the engine 102 begins at 402. The method is described in the context of the modules of FIG. 3. However, the particular modules that perform the steps of the method may be different than the modules mentioned below, or the method may be implemented apart from the modules of FIG. 3. Also, while the method is described as making decisions based on the switching period of the intake valve lift actuator 162, the method may make decisions in a similar manner based on one or both of the switching periods of the valve lift actuators 162, 164.

At 404, the valve lift control module 312 switches the intake valve lift actuator 162 between the zero, low, and high lift positions. At 406, the switching period module 316 determines the period that elapses as the intake valve lift actuator 162 switches between two of the zero, low, and high lift positions. At 408, the oil contamination level module 318 determines the oil contamination level of the engine 102 based on multiple values of the switching period. At 410, the switching period module 316 determines the first period based on the oil contamination level, the engine oil temperature, and the vehicle altitude.

At 412, the switching period module 316 determines whether the current value of the switching period is greater than the first period. If the current value of the switching period is greater than the first period, the method continues at 414. Otherwise, the method continues at 416. At 416, valve lift control module 312 adjusts the intake valve lift actuator 162 to the low lift position before the start-stop module 314 automatically stops the engine 102.

At 414, the valve lift control module 312 adjusts the intake valve lift actuator 162 to the low lift position before the start-stop module 314 automatically stops the engine 102. At 418, the switching period module 316 activates the service indicator 198 to notify the driver that an oil change is required. In various implementations, instead, of continuing at 414 when the current value of the switching period is greater than the first period, the method may continue at 420, and then continue at 418 or 422. At 420, the start-stop module 314 prevents automatic engine stops. In other words, the start-stop module 314 does not automatically stop the engine 102. The method ends at 422.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A system comprising:
   a switching period module that determines a switching period that elapses as a valve lift actuator of an engine switches between a first valve lift position and a second valve lift position that is different than the first valve lift position, wherein the switching period begins when a measured position of the valve lift actuator corresponds to the first valve lift position and the switching period ends when the measured position of the valve lift actuator corresponds to the second valve lift position; and
   at least one of:
      a valve lift control module that controls the valve lift actuator in response to the duration of the switching period; and
      a start-stop control module that determines whether to turn off the engine independent of an ignition system in response to the duration of the switching period.

2. The system of claim 1 wherein the first valve lift position and the second valve lift position each include one of a zero lift position, a low lift position, and a high lift position.

3. The system of claim 1 wherein the valve lift actuator switches between the first valve lift position and the second valve lift position by translating a lobe of a camshaft along a longitudinal axis of the camshaft.

4. The system of claim 1 wherein at least one of:
   the system comprises the valve lift control module, and the valve lift control module controls the valve lift actuator based on whether the switching period is greater than a first period; and
   the system comprises the start-stop control module, and the start-stop control module determines whether to turn off the engine independent of the ignition system based on whether the switching period is greater than the first period.

5. The system of claim 4 wherein the system comprises the start-stop control module, and the start-stop control module does not turn off the engine independent of the ignition system when the switching period is greater than the first period.

6. The system of claim 4 wherein the switching period module activates a service indicator when the switching period is greater than the first period.

7. The system of claim 1, wherein the switching period begins when the measured position of the valve lift actuator lastly corresponds to the first valve lift position and the switching period ends when the measured position of the valve lift actuator initially corresponds to the second valve lift position.

8. The system of claim 1, wherein each of the first and second valve lift positions indicates a maximum amount by which the valve lift actuator lifts a valve from a valve seat.

9. A system comprising:
   a switching period module that determines a switching period that elapses as a valve lift actuator of an engine switches between a first valve lift position and a second valve lift position that is different than the first valve lift position, wherein the switching period begins when a measured position of the valve lift actuator corresponds to the first valve lift position and the switching period ends when the measured position of the valve lift actuator corresponds to the second valve lift position; and
   a valve lift control module that adjusts the valve lift actuator to a low lift position before the engine is stopped when the switching period is greater than a first period.

10. A system comprising:
    a switching period module that:
       determines a switching period that elapses as a valve lift actuator of an engine switches between a first valve lift position and a second valve lift position that is different than the first valve lift position, wherein the switching period begins when a measured position of the valve lift actuator corresponds to the first valve lift position and the switching period ends when the measured position of the valve lift actuator corresponds to the second valve lift position; and
       determines a first period based on an engine oil contamination level, an engine oil temperature, and a vehicle altitude; and
    at least one of:
       a valve lift control module that controls the valve lift actuator based on whether the switching period is greater than the first period; and
       a start-stop control module that determines whether to turn off the engine independent of an ignition system based on whether the switching period is greater than the first period.

11. The system of claim 10 wherein, before the engine is stopped, the switching period module:
    predicts whether the valve lift actuator is capable of switching from one of a zero lift position and a high lift position to a low lift position within a second period when the engine is restarted based on the engine oil contamination level, the engine oil temperature, and the vehicle altitude; and
    determines the first period based on the prediction.

12. The system of claim 10 further comprising an oil contamination level module that determines the engine oil contamination level based on multiple values of the switching period.

13. A method comprising:
    determining a switching period that elapses as a valve lift actuator of an engine switches between a first valve lift position and a second valve lift position that is different than the first valve lift position, wherein the switching period begins when a measured position of the valve lift actuator corresponds to the first valve lift position and the switching period ends when the measured position of the valve lift actuator corresponds to the second valve lift position; and
    at least one of:
       controlling the valve lift actuator in response to the duration of the switching period; and
       determining whether to turn off the engine independent of an ignition system in response to the duration of the switching period.

14. The method of claim 13 wherein the first valve lift position and the second valve lift position each include one of a zero lift position, a low lift position, and a high lift position.

15. The method of claim 13 further comprising switching between the first valve lift position and the second valve lift position by translating a lobe of a camshaft along a longitudinal axis of the camshaft.

16. The method of claim 13 further comprising at least one of:
controlling the valve lift actuator based on whether the switching period is greater than a first period; and
determining whether to turn off the engine independent of the ignition system based on whether the switching period is greater than the first period.

17. The method of claim 16 further comprising determining the first period based on an engine oil contamination level, an engine oil temperature, and a vehicle altitude.

18. The method of claim 17 further comprising, before the engine is stopped:
predicting whether the valve lift actuator is capable of switching from one of a zero lift position and a high lift position to a low lift position within a second period when the engine is restarted based on the engine oil contamination level, the engine oil temperature, and the vehicle altitude; and
determining the first period based on the prediction.

19. The method of claim 16 further comprising not turning off the engine independent of the ignition system when the switching period is greater than the first period.

20. The method of claim 17 further comprising determining the engine oil contamination level based on multiple values of the switching period.

21. The method of claim 16 further comprising adjusting the valve lift actuator to a low lift position before the engine is stopped when the switching period is greater than the first period.

22. The method of claim 16 further comprising activating a service indicator when the switching period is greater than the first period.

23. The method of claim 13, wherein the switching period begins when the measured position of the valve lift actuator lastly corresponds to the first valve lift position and the switching period ends when the measured position of the valve lift actuator initially corresponds to the second valve lift position.

24. The method of claim 13, wherein each of the first and second valve lift positions indicates a maximum amount by which the valve lift actuator lifts a valve from a valve seat.

* * * * *